United States Patent
Tschirhart

(10) Patent No.: US 8,130,204 B2
(45) Date of Patent: Mar. 6, 2012

(54) ENVIRONMENT SYNCHRONIZED IMAGE MANIPULATION

(75) Inventor: Michael D. Tschirhart, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1195 days.

(21) Appl. No.: 11/862,468

(22) Filed: Sep. 27, 2007

(65) Prior Publication Data

US 2009/0085876 A1    Apr. 2, 2009

(51) Int. Cl.
*G06F 3/041* (2006.01)

(52) U.S. Cl. .......................... 345/173; 345/156

(58) Field of Classification Search ............ 345/87–102, 345/204, 212
See application file for complete search history.

(56) References Cited

U.S. PATENT DOCUMENTS

| | | | | |
|---|---|---|---|---|
| 5,960,381 | A * | 9/1999 | Singers et al. | 702/183 |
| 6,496,177 | B1 * | 12/2002 | Burton | 345/101 |
| 7,193,583 | B2 * | 3/2007 | Zerphy et al. | 345/1.3 |
| 2002/0158883 | A1 * | 10/2002 | Cheri et al. | 345/589 |
| 2004/0070565 | A1 | 4/2004 | Nayar et al. | |
| 2005/0012755 | A1 | 1/2005 | Dresevic et al. | |
| 2006/0139295 | A1 * | 6/2006 | Eberhard et al. | 345/101 |
| 2007/0126727 | A1 * | 6/2007 | Chiang | 345/207 |
| 2008/0174532 | A1 * | 7/2008 | Lewis | 345/85 |
| 2009/0009484 | A1 * | 1/2009 | Yu et al. | 345/173 |
| 2009/0033591 | A1 * | 2/2009 | Ikeya | 345/60 |
| 2009/0153438 | A1 * | 6/2009 | Miller et al. | 345/55 |
| 2009/0167676 | A1 * | 7/2009 | Edwards et al. | 345/102 |
| 2009/0225065 | A1 * | 9/2009 | Overes | 345/207 |
| 2009/0278766 | A1 * | 11/2009 | Sako et al. | 345/8 |
| 2010/0188443 | A1 * | 7/2010 | Lewis et al. | 345/691 |

OTHER PUBLICATIONS

Office Action received from German Patent Office mailed May 7, 2009.

* cited by examiner

*Primary Examiner* — Nitin Patel

(74) *Attorney, Agent, or Firm* — Brinks Hofer Gilson & Lione

(57) ABSTRACT

A system for interfacing with a user. The system includes a sensor, a controller, and a display. The sensor is configured to sense environmental conditions about the display and communicate the environmental conditions with the controller. The controller is configured to generate graphics and provide the graphics to the display. The graphics include one or more environmental display elements that correspond to the environmental condition sensed by the sensor.

16 Claims, 2 Drawing Sheets

ENVIRONMENT SYNCHRONIZED IMAGE MANIPULATION

BACKGROUND

1. Field of the Invention

The present invention generally relates to a system for interfacing with a user.

2. Description of Related Art

A user may more effectively use a graphical interface if the interface closely relates to the real world. Currently, information displays and/or user interfaces provide information created by artificially generated graphics. One such display may include a touch screen control for a radio or navigation system in a vehicle. Often, these displays have a distinctly unnatural appearance that can provide undesirable aesthetic and functional characteristics. For example, in some touch screen interfaces, a rectangle may be provided to delineate an area that the user can touch to perform an action. However, if the rectangle is provided isometrically as a three dimensional button pressing the area on the screen will be more intuitive for the user. Even with isometric rendering most user interfaces still have an artificial look and feel.

SUMMARY

In overcoming the enumerated drawbacks and other limitations of the related art, the present invention provides an improved system for interfacing with a user. The system generally includes a sensor, a controller, and a display. The sensor is configured to sense the environmental conditions around the display that would affect the perception of physical buttons (or other objects) being represented by graphics on the display. The sensor generates a signal communicating the environmental conditions with the controller. The controller is configured to generate graphics and provide the graphics to the display. The graphics include one or more environmentally corrected display elements that correspond to the environmental conditions sensed by the sensor.

In one aspect of the invention, the sensor senses the direction of ambient light with respect to the display and generates graphical elements based on the direction of the ambient lighting. For example, the controller may generate shadows based on the actual direction of lighting applied to the display. The system may include sensors located about the display, for example, at the top, bottom, left, and right of the display. As such, the controller may compare the signal of the two oppositely positioned sensors to determine the direction of the ambient lighting.

In another aspect of the invention, the sensor is configured to sense the temperature conditions around the display. Accordingly, the controller is configured to change a background color of the display or implement a visual indicator corresponding to the temperature.

Further objects, features and advantages of this invention will become readily apparent to persons skilled in the art after a review of the following description, with reference to the drawings and claims that are appended to and form a part of this specification.

DETAILED DESCRIPTION

Figure 1:
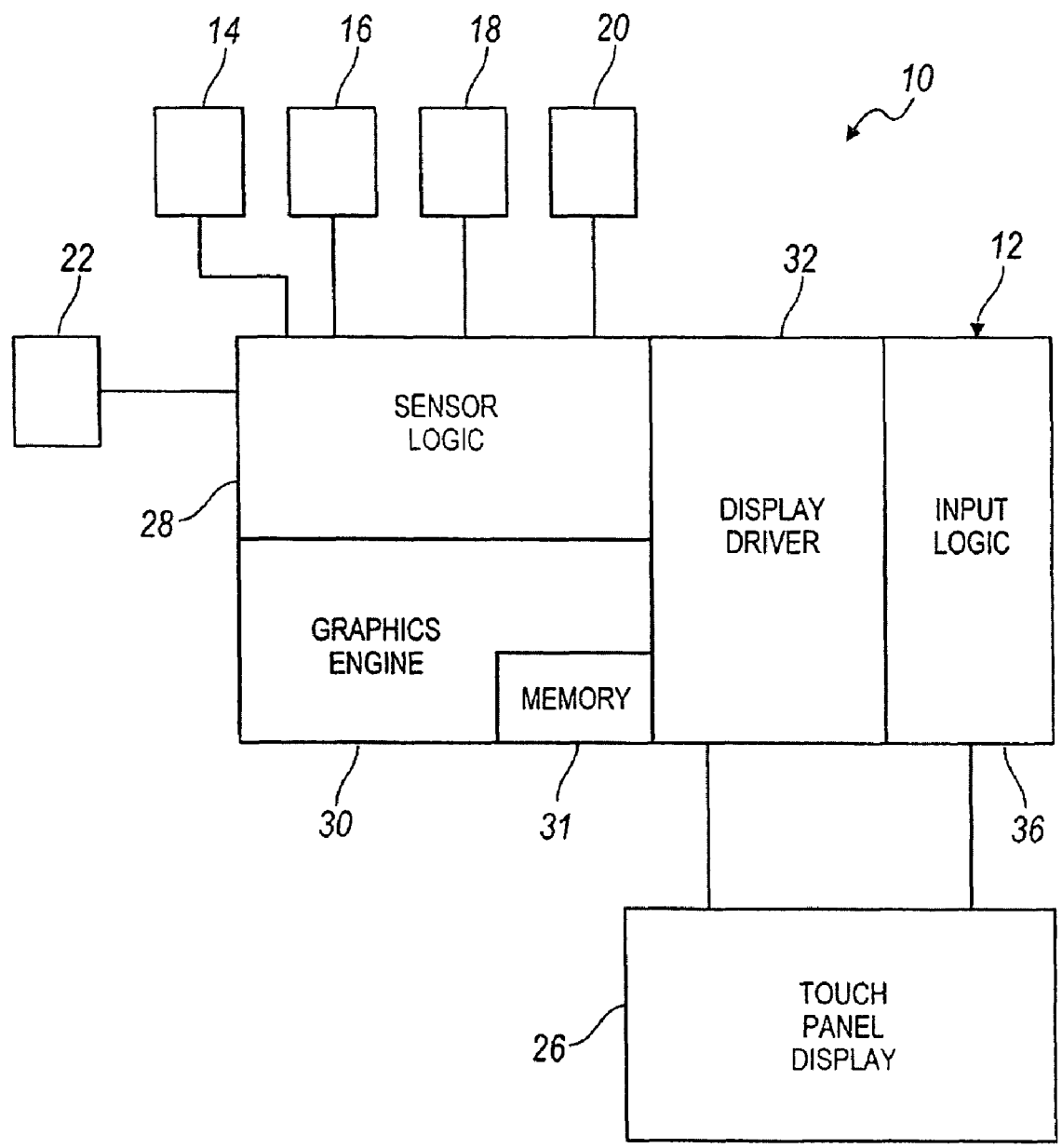
FIG. 1 is a schematic diagram of a system for generating graphics according to one embodiment of the invention.

Referring now to FIG. 1, a system embodying the principles of the present invention is illustrated therein and designated at 10. As its primary components, the system 10 includes a controller 12, sensors 14-22, and a display 26. The controller 12 is configured to control at least part of a vehicle subsystem, such as an audio system, a navigation system, a climate control system, etc. The controller 12 may include logic to manipulate the appropriate vehicle subsystem, as well as, generate graphics for the display 26, such graphics being, for example, controls used in a graphical user interface. As such, the data from one or more sensors is processed by the controller to change a characteristic of the image, such as shadow, color, saturation, hue, etc.

As noted above, the controller 12 is in communication with sensors 14-22 to sense environmental conditions and adjust the graphics display accordingly. In one example, sensors 14, 16, 18 and 20 sense ambient lighting conditions and interpret the lighting conditions to identify the direction of the ambient lighting across the display 26. As such, the sensors 14-20 may be photo diodes located about the display 26. However, other light sensitive devices may be used, including various color or infrared sensors. Other environmental conditions may also be monitored. As such, a temperature sensor 22 may also be in communication with controller 12 to provide ambient temperature data to the controller 12.

A sensor logic module 28 within the controller 12 receives the signals from each of the sensors 14-22. The sensor logic module 28 includes logic to interpret the sensor signals and identify the state of the environmental conditions. As described above, each of the sensors 14-20 may be photo diodes that provide an electrical signal based on the intensity of the light projected on each sensor. As such, each of the sensors 14-20 may be located at equal intervals about the display 26. The sensor logic module 28 may therefore include a look-up table that converts the voltage of the electric signal into a light intensity measure. By comparing the signal of one sensor to another sensor the sensor logic module 28 interprets the distribution or direction of ambient light across the display 26. The sensor logic module 28 provides data to the graphic engine module 30 identifying one or more of the environmental conditions about the display 26. The data may be provided from the sensor logic module 28 to the graphics engine module 30 through electrical signals or a shared memory store or some other means.

Based on the environmental conditions received from the sensor logic module 28, the graphics engine module 30 generates application graphics. In one example, the direction of ambient light across the display 26 may be used as the input to a ray trace algorithm to generate graphics having a perceived depth or shadowing that correspond to the actual direction of ambient light. Such ray tracing programs are readily used in video game applications. However, the actual direction of ambient light is ignored in video games and an arbitrary or predefined light source position is used based on desire of the graphic artist.

In another embodiment, the graphics engine may use temperature data from the temperature sensor 22 to change a background color of the screen (i.e., red for hot and blue for cold) or provide a visual indicator, such as an optical wave across the screen, emulating the optical effect of heat rising from a highway, or creating a wave in the image of the background scenery. As such, the graphics engine 30 may generate graphic elements (i.e., controls) and corresponding environmental display elements (i.e., shadows or waves) within the output graphics that are provided to the display 26.

The graphics engine 30 may be configured to fix the graphics including the graphic elements and environmental display elements within the graphics engine, for example, by storing the graphical data in memory 31 or communicating the graphical data to a display driver 32 through electrical signals. The display driver 32 receives the graphical data and generates a display signal that is provided the display 26.

The display 26 may be a cathode ray tube (CRT), projection monitor, liquid crystal display (LCD), plasma display, or similar display. In addition, the display 26 may be a touch panel display thereby providing the system 10 with an interactive input mechanism to manipulate graphical elements, such as controls, by touching the display 26. As such, the controller 12 may include an input logic module 36 in communication with the display 26 to receive input data and manipulate configuration information of the system 10. The display driver 32 and the input logic module 36 may communicate with the display 26 through electrical signals, for example, provided through a cable or wire harness.

Figure 2:
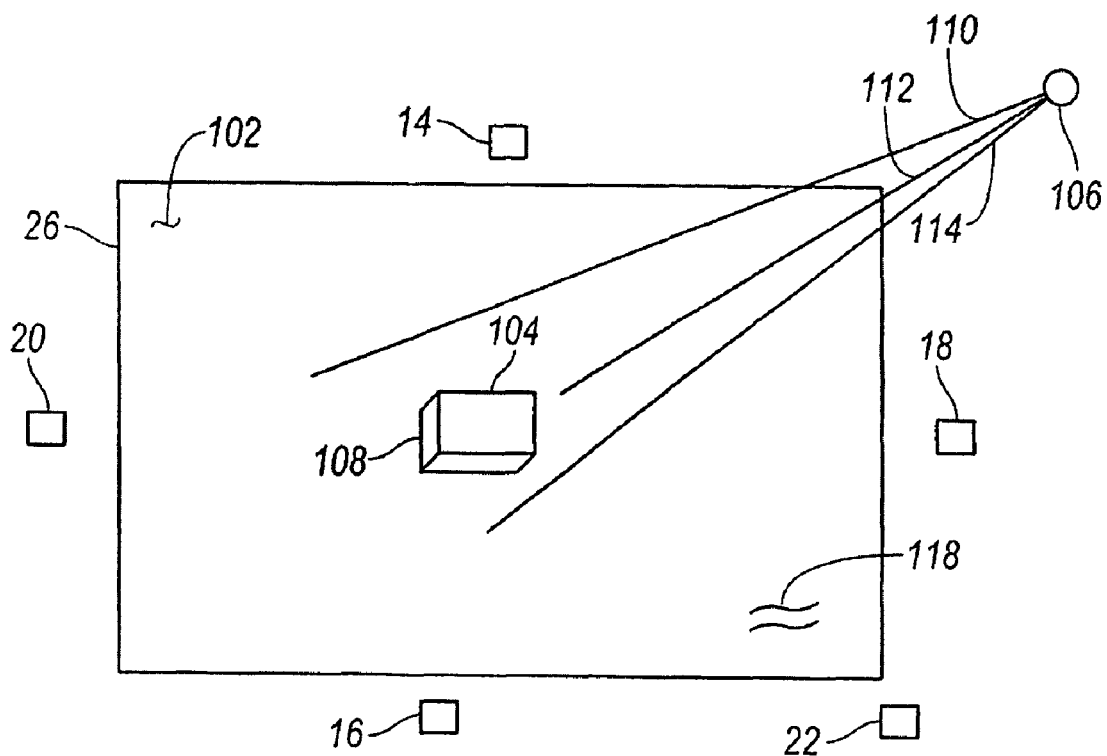
FIG. 2 is a front view illustration of the display and sensors with light being presented across the display in a first direction.

Now referring to FIG. 2, an illustration of a display 26 is provided with ambient light shining in a first direction from a source 106. The display 26 may have a background field or image 102, and, as discussed above, one or more controls 104 may be provided on the background 102. As will be readily appreciated, a physical button would have a certain depth of travel and may stick out from the control panel. However, the control 104 is a virtual control and, therefore, may appear flat on the display 26. While the button may be drawn in 3-D to provide a three-dimensional look and feel, the control 104 may have an artificial look if ambient conditions surrounding the control are not taken into consideration. As such, the sensors 14-22 are located about the display 26.

As indicated by ray traces 110, 112, 114, from the light source 106, the light intensity will be higher closer to the source 106 and less intense further away from the source 106. Each of the sensors 14-20 may receive some of the light from the light source 106 and generate an electrical signal in response to the light intensity received. However, sensor 14 and sensor 18 are closer to the light source 106 and, therefore, will receive a higher intensity light than sensor 20 and sensor 16. Accordingly, by comparing the signals from sensor 14 and sensor 16, the controller 12 will be able to determine that the light source 106 is above the display. Similarly, by comparing sensor 18 and sensor 20, the controller 12 will be able to determine that the light source 106 is to the right of the display 26. As such, the location of the light source 106 may be calculated by looking at the derived intensity ratio between each the sensors 14-20. If the control 104 had a defined virtual depth, a ray trace algorithm may be utilized to understand the projection of the light source onto the control 104. Accordingly, a graphical element 108 is calculated that corresponds to the actual light source 106 and the defined depth of control 104. The graphical element 108 in FIG. 2 is shown with shadowing, however, glare, reflections, texture, or similar elements may additionally or alternatively be used. In addition, the graphical elements may be produced using real time rendering or based on stored images that are selected based on the sensor signal. Further, the defined depth may be changed based on whether the control 104 is active or inactive much like a button being pushed in or released. Further, it is clearly understood by one of ordinary skill in the art that although the control 104 is shown as a button, various other controls may be utilized, including, without limitation, dials, sliders, levers, etc. Further, it may be noted that temperature sensor 22 may be provide adjacent the display 26 to gather temperature information around the display 26. As such, the graphics may be adjusted based on the temperature data. For example, waves denoted by reference number 118 may be introduced dynamically into the graphics, illustrating and simulating a rising heat wave effect, if the temperature data is above a predefined temperature.

Figure 3:
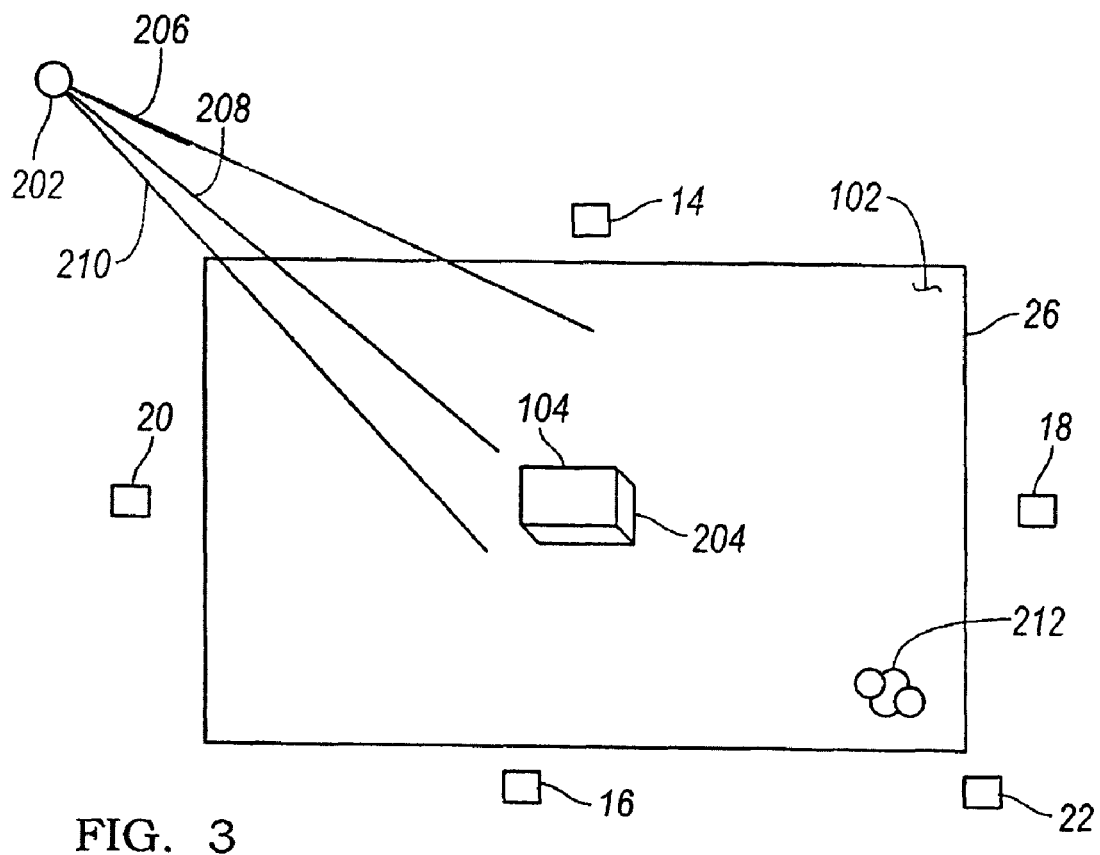
FIG. 3 is a front view illustration of the display and sensors with light being presented across the display from a second direction.

For reference, FIG. 3 provides an illustration of the display 26 with ambient light shining in a second direction from source 202. As such, the display 26, the sensors 14-22, the background 102, and the control 104 correspond to the same elements provided with regard to FIG. 2. However, the light source 202 replaces the light source 106 from FIG. 2 and is located in an upper left position of the figure. The direction from the light source 202 is indicated by the ray traces 206, 208, and 210. Similar to the scenario described in FIG. 2, the location of the light source 202 may be calculated by looking at the derived intensity ratios between the sensors 14-20. For example, light source 202 would be closer to sensor 20 than sensor 18 indicating that, in FIG. 3, this time light source 202 is located to the left of the display 26. Accordingly, the shadow region 204 is provided on the right and bottom of the control 104, properly corresponding to the position of the light source 202. In addition, the temperature in FIG. 3 may be colder, therefore, a crystal shaped indicator 212 may be displayed. The crystal shaped indicator 212 may be integrated into the displayed graphics or background 102 indicating that the temperature has fallen below the predetermined level. If two light sources are present, the system may implement the shadow from the dormant light source or, alternatively, implement shadows based on both light sources for each control.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A system for generating graphics on a display, the system comprising:
    at least one sensor configured to sense an environmental condition about the display that affects perception of the graphics; and
    a controller in communication with the at least one sensor, the controller being configured to generate at least one environmental display image within the graphics, wherein the at least one environmental display image corresponds to the environmental condition sensed by the sensor.

2. The system according to claim 1, wherein the at least one sensor is configured to sense ambient lighting conditions.

3. The system according to claim 2, wherein the at least one sensor is configured to sense the direction of the ambient lighting.

4. The system according to claim 3, wherein the at least one environmental display image is a shadow.

5. The system according to claim 3, wherein the at least one sensor is at least two sensors and wherein a sensor logic module compares signals from the at least two sensors to determine the direction of ambient lighting.

6. The system according to claim 1, wherein the at least one sensor is configured to sense temperature conditions.

7. The system according to claim 6, wherein the graphics engine is configured to change a background color of the display based on the environmental condition.

8. The system according to claim 6, wherein the graphics engine is configured to introduce a wave into the display based on the environmental condition.

9. A system for generating graphics on a display, the system comprising:
    at least one sensor configured to sense a direction of ambient lighting; and
    a controller in communication with the at least one sensor to receive a signal corresponding to the direction, the controller being configured to generate a shadow image within the graphics, wherein the shadow image corresponds to the direction of ambient lighting.

10. The system according to claim 9, wherein the at least one sensor is at least two sensors and wherein a sensor logic module compares the at least two sensors to determine the direction of ambient lighting.

11. A method for generating graphics on a display, the method comprising the steps of:
    sensing an environmental condition around the display that affects perception of the graphics;
    generating at least one environmental display image within the graphics, wherein the at least one environmental display image corresponds to the environmental condition;
    fixing the graphics within memory.

12. The method according to claim 11, wherein the step of sensing the environmental condition includes sensing ambient lighting conditions.

13. The method according to claim 12, wherein the step of sensing ambient lighting conditions includes sensing the direction of the ambient lighting.

14. The method according to claim 13, wherein the at least one environmental image element is a shadow.

15. The method according to claim 11, further comprising the step of comparing at least two sensor outputs to analyze the environmental condition.

16. The method according to claim 11, wherein the step of sensing the environmental condition includes sensing temperature conditions.

* * * * *

UNITED STATES PATENT AND TRADEMARK OFFICE
CERTIFICATE OF CORRECTION

PATENT NO. : 8,130,204 B2
APPLICATION NO. : 11/862468
DATED : March 6, 2012
INVENTOR(S) : Michael D. Tschirhart It is certified that error appears in the above-identified patent and that said Letters Patent is hereby corrected as shown below:

In the Claims

In column 6, claim 14, line 30, after "environmental image" delete "element".

Signed and Sealed this
First Day of May, 2012

David J. Kappos
*Director of the United States Patent and Trademark Office*